Jan. 3, 1967   R. B. TURNBULL   3,295,228
VISUAL DISPLAY AND METHOD OF ORGANIZING THE SAME
Filed July 6, 1964
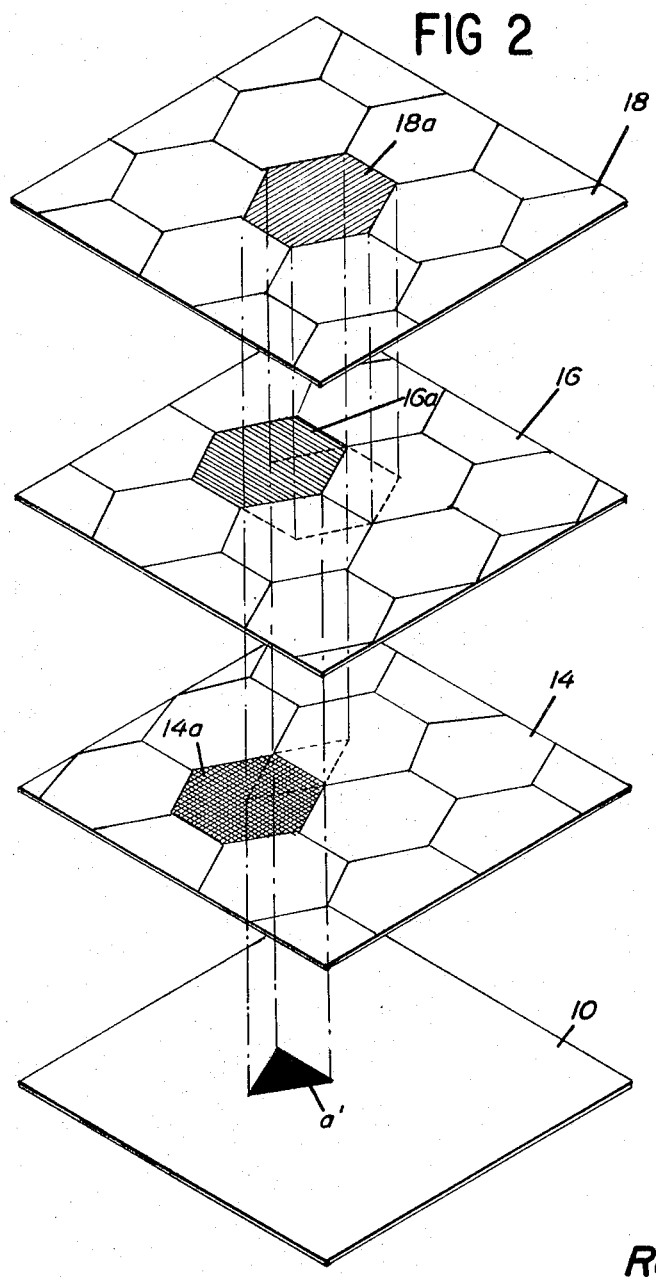
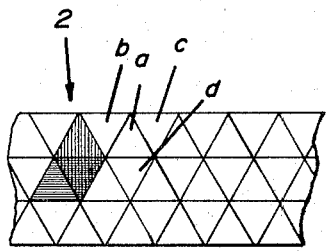
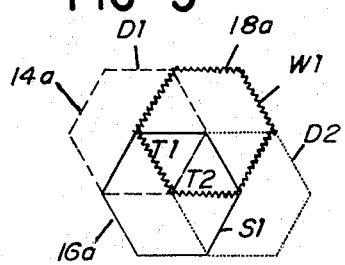
*Robert B. Turnbull*
INVENTOR
BY
ATTORNEYS

3,295,228
VISUAL DISPLAY AND METHOD OF ORGANIZING THE SAME
Robert B. Turnbull, 620 23rd St. NW.,
Washington, D.C. 20027
Filed July 6, 1964, Ser. No. 380,457
14 Claims. (Cl. 35—27)

This invention relates generally to visual displays, and is particularly concerned with a new type of visual display, and a method of organizing such display.

In making visual displays, such as patterns, or the like, one attempts to assign given areas of the display some color characteristics and/or visual characteristics that result in the ultimate creation of a pleasing appearance. The processes used in achieving the ultimate appearance can vary quite widely. For example, an artist can merely create a display with his own ingenuity and creativeness, but without any necessarily prescribed organization. In contrast, and at the other extreme, a display can be created by merely organizing a given series of spaces, and then inserting into each space of the series, a prescribed color.

If one follows the first of the above-mentioned processes, for example, the ultimate result may or may not be pleasing in visual appearance, depending upon the personality, ingenuity and creativeness of the artist. If one follows the latter mentioned process, then the ultimate appearance of the display assumes a more or less mechanical aspect, and moreover, there can be a complete absence of any blending between respective portions of the display.

The preceding discussion is not intended to be a complete and entirely comprehensive discussion of the various different approaches which have previously been taken in the formation of visual displays. Instead, such discussions merely indicates the areas of weakness and/or disadvantages which can be encountered in producing displays. Moreover, such discussion serves as a background which facilitates in understanding the instant invention.

Consistent with the invention, the personality and creativeness of the designer are not of major significance since a prescribed organizational technique is used so that the final visual display created in accordance with the invention assumes virtually an automatic pleasing appearance. In contrast with prior techniques, the display provided hereby and the method of forming the same consistent herewith utilizes an organization of display characteristics. For example, and consistent with the preferred embodiment hereof, the hue, value and chroma characteristics of prescribed areas of the ultimate display are preselected, but assembled in generally a heterogeneous manner.

In clarification and explanation of the above, it is helpful to initially consider and understand these characteristics. Hue can essentially be regarded as defining the color itself, e.g., red, green, etc. Value, on the other hand, can be regarded as defining the brilliance of a color—i.e., the degree of lightness or darkness. Chroma, in contrast, defines the vividness or departure from gray, of a color.

By selecting the hue, value, and chroma of adjacent areas, one can organize an over-all display which has a particularly pleasing appearance. To make this selection by prescribed or predetermined technique, however, can be overly time consuming and, moreover, the ultimate appearance of a display made by selection but without any predetermined or predescribed organization does not necessarily result in a pleasing ultimate appearance.

By way of describing a more specific example, let it be assumed that a display designer wishes to form a particular shape having particular visual properties or characteristics therewithin. In the past, a designer would select the shape, e.g., a triangle, and would cause it to be characterized in a desired manner, as for example, by having a particular color of a desired brilliance and vividness. He would arrive at this desired characterization by experimentally mixing and blending the color forming medium, such as paints, until the triangle was finally filled with a colored portion having the characteristics which pleased the designer. These characteristics would provide, within the triangle, a certain hue, a certain value and a certain chroma. However, since the hue, value and chroma were experimentally compounded, the designer had no way of determining exactly which of the steps in the hue scale, the value scale and the chroma scale, were used to arrive at the final characterization within the triangle. Hence, it was not possible to scientifically duplicate the precise displayed triangle.

It will be appreciated that, in view of the foregoing, it would be both desirable and beneficial to provide a manner wherein the separate elements or characteristics of a design could be deliberately and selectively blended in a scientific and calculated manner to arrive at a final display having known characteristics. Such a display would be capable of exact reproduction without any experimental steps being utilized.

The present invention has as one of its primary objects, and by way of example, the provision of a technique or method of organizing a visual display permitting the random creation of adjacent color areas having hue, value and chroma characteristics which inherently render such areas, as incorporated in the overall display, compatible and organized for a pleasing appearance.

More specifically, it is a primary object of the present invention to provide a visual display incorporating a plurality of identically shaped and equally dimensioned areas therein, which areas are so organized automatically that adjacent areas share common characteristics, so as to present a pleasing ultimate visual appearance.

Consistent with the immediately preceding object, it is a further significant object of the present invention to provide a method of organizing a visual display which permits the artist to creatively select arrangements of given characteristics and to then automatically combine the arrangements into an ultimate display, wherein the areas have an organization of common characteristics.

Although the characteristics of hue, value, and chroma have been discussed above, it is to be understood that such characteristics have been considered only by way of example. Other characteristics for given areas of the ultimate display can similarly be organized and varied. Again, by way of example, the depth characteristics can be automatically controlled in accordance with the invention.

According to the invention, and as incorporated in the preferred embodiments hereof, a visual display is created which has different characteristics in different portions thereof. The display comprises a multitude of identically shaped areas with each area in the display having at least three visual characteristics, and with all areas in the display adjacent any one given area having at least two of the characteristics the same as two of the characteristics in the one given area. Such a display is achieved by providing a first plurality of patterns, by assigning to each of the patterns different visual characteristics (e.g., hue, value, chroma, and/or depth), by overlapping portions of each of the patterns to define identically shaped adjacent areas throughout the ultimate display, and by thereafter assigning to each of the areas the characteristics of the overlapped pattern used to define that area.

The invention will be better understood, and objects other than those set forth above will become apparent, when consideration is given to the following detailed description. Such description makes reference to the annexed drawing presenting a preferred and illustratve embodiment of the invention. In the drawing, FIGURE 1 is a plan view of a fragment of a visual display formed in accordance with the invention;

FIGURE 2 is an exploded view showing one manner in which a visual display can be formed in accordance herewith; and FIGURE 3 is a fragmental plan view showing another manner in which a visual display can be made in accordance herewith and further showing certain aspects of a display made consistent with the technique of FIGURE 2.

If reference is first made to FIGURE 1, it will be noted that the portion of the visual display shown therein is generally designated by the numeral 2. This display has different characteristics in different portions thereof as indicated by the shading, and comprises a multitude of identically shaped areas $a, b, c, d,$ etc. All of the areas in the display adjacent any given one area in the display have at least two characteristics common with the one area. In other words, if the area $a$ is considered as the one area, then areas $b, c,$ and $d$ have at least two of the characteristics possessed by the area $a$.

The foregoing will be better understood if reference is now made to FIGURE 2. In FIGURE 2, the sheet 10 is intended to carry the ultimate display. The area $a'$ forms part of this display. Thus, when the display on the sheet 10 is completed, it will consist of a plurality of areas which are all equally shaped and equally dimensioned with the area $a'$. For simplicity, the area $a'$ can be considered as but one area of the display to be formed on the sheet 10, just as the area $a$ of FIGURE 1 is but one area of the display 2.

Disposed in stacked relation above the sheet 10 are a plurality of transparent grids 14, 16 and 18. Each of the grids 14, 16 and 18 carries a hexagon pattern. The hexagons on the respective sheets are identically geometrically shaped and dimensioned and, thus, the three grids 14, 16 and 18, in effect, provide a plurality of series of identical geometrically shaped patterns.

Now, let it be assumed, that the ultimate display to be provided is to have differing hue, value and chroma characteristics. In this instance, let it be further assumed that the grid 14 is a hue grid, that the grid 16 is a value grid and that the grid 18 is a chroma grid.

The grid 14 would then have the plurality of hexagons thereon with given hues. One or more hues may be incorporated and these hues can be generally haphazardly assigned to different of the hexagons. The hexagon 14a, as one of the hexagons, would accordingly have a given hue assigned thereto.

In a similar manner, the hexagons on the grid 16 would have values assigned thereto. The hexagon 16a, like other hexagons on the grid 16, would accordingly have a given value. Similarly, the hexagons on the grid 18 would have chromas assigned thereto. A given chroma would be assigned to the hexagon 18a, but the other hexagons on grid 18 would similarly have specific chromas.

It has been found particularly desirable to use two different hues on the hue grid, two different values on the value grid, and two different chromas on the chroma grid. However, the invention is not necessarily so restricted, and any number of chromas can be assigned to different hexagons on the chroma grid, with any value being assigned to any hexagon on the value grid, and with any hue being assigned to a given hexagon on the hue grid.

The assignment of the hues, values, and chromas to different hexagons on the respective grids can be handled in a haphazard random fashion or in accordance with the creativeness and/or imagination of the artist.

Regardless of the manner in which the particular hue, value and chroma is assigned to any given hexagon or its respective grid, after the assignment has been made, each of the hexagons on the chroma grid have a given chroma, each of the hexagons on the value grid have a given value, and each of hexagons on the hue grid have a given hue. It is important that the particular characteristic, i.e., given hue, given value or given chroma, extend throughout a complete hexagon, but as indicated, the chroma can vary from hexagon to hexagon on the chroma grid, the value can vary from hexagon to hexagon on the value grid, and the hue can vary from hexagon to hexagon on the hue grid.

Once given chromas have been assigned to the hexagons on the chroma grid 18, given values have been assigned to the hexagons on the value grid, and given hues have been assigned to hexagons on the hue grid, then the respective grids are, consistent with this exemplary discussion, arranged in offset relation to one another so that respective hexagons on each grid intersect or overlap to define given equally dimensioned, and smaller geometric areas. For simplicity, consider the three hexagons 18a, 16a and 14a of the chroma, value and hue grids respectively. These hexagons have been so oriented that they visect hexagons in other grids, and cumulatively trisect to define, as the overlapped area, the triangle $a'$ which appears on the sheet 10. The overlapping hexagons on the respective grids would similarly define adjacent triangles continuously disposed over the entire sheet 10, or area thereof carrying a display thereon.

To this end, consider FIGURE 3. Here, the hexagon 18a is designated by wavy lines, the hexagon 14a by dash lines and the hexagon 16a by solid lines. It will be noted that the triangle T-1 represents the triangle defined by the overlap of the respective hexagons 18a, 14a and 16a. A similar triangle T-2 is defined by the area of overlap of the hexagons 18a, 16a and D-2. The hexagon D-2 represents the hexagon adjacent the hexagon 14a on grid 14.

From the foregoing discussion, it will be appreciated that the method hereof contemplates organizing a display having different visual characteristics in different portions thereof, which method comprises initially, the steps of providing a plurality of series of identical geometrically shaped patterns, assigning to each of said series different visual characteristics, and overlapping portions of each of said series of patterns to define identically shaped adjacent areas throughout the display. The plurality of series of identical geometrically shaped patterns are represented by grids 18, 16 and 14. The manner of assignment to each of the series of different visual characteristics has been discussed with respect to the hue, value and chroma hexagon assignment. The overlapping of the series of patterns to define the identically shaped adjacent areas, namely, the triangle ($a'$, T–1 or T–2) on the display has also been considered.

Now, having once organized the display, assigned the characteristics to the patterns, and overlapped the patterns as aforesaid, then the artist will, consistent with the invention, assign to the triangle the characteristics of the overlapped portions of the patterns. More specifically, the triangle T–1 being an overlapped portion of the hexagons 18$a$, 14$a$ and 16$a$ will have a chroma corresponding to that of the hexagon 18$c$, a value corresponding to that of the hexagon 16$a$ and a hue corresponding to that of the hexagon 14$a$. In contrast, the triangle T–2 will have a chroma corresponding to that of the hexagon 18$a$, a value corresponding to that of the hexagon 16$a$, but a hue corresponding to that of the hexagon D–2. This difference results from the fact that the triangle T–2 is defined by a different overlap of respective hexagons. Still, it is to be noted that at least two of the characteristics of the triangle T–2 correspond to two of the characteristics of the triangle T–1. Only one characteristic differs in this instance and consistent with the above example, namely, the hue.

Even though the invention can be easily carried out by using respective grids, such as the grids, 18, 16 and 14, an equally advantageous result can be obtained by merely drawing overlapping hexagons. For example, again consider FIGURE 3. Here, the hexagons have been drawn in overlapping relation to one another on a plain sheet. If, even with this arrangement, given hues are assigned to the dash line hexagons, given values are assigned to the solid line hexagons and different chromas are assigned to the wavy line hexagons, the same result as achieved with the overlapping grids is obtained. Again, respectively adjacent triangles T–1 and T–2, for example, share common chroma and value characteristics, but differ in hue characteristic. The relationship between the triangles T–1 and T–2 is the same as the relationship between other adjacent triangles, although the particular characteristic will differ.

As opposed to using hue, value and chroma, one of the grids 14, 16 or 18, for example, can represent depth, with given depth characteristics being assigned to each hexagon in such grid. In this instance, the general result would be the same, but as opposed to having hue, value and chroma only, one of the characteristics of the resultant display would be depth.

With the technique described in connection with FIGURE 2, the plurality of series of identically geometrically shaped patterns, i.e., hexagon patterns, are provided separately and then the same are disposed so as to overlap to define the respective triangles. The same two steps are utilized when the hexagons are drawn on a sheet of paper in overlapping relation, but in this instance, the steps are performed simultaneously—i.e., the hexagons are provided and overlapped at the same time. Also, in practice, a field of triangles can be drawn and then the three fields of color-determining hexagons can be inferred and delineated.

The invention has been described with respect to the use of hexagon patterns defining triangular areas in the ultimate design. The use of hexagons and triangles, however, is only preferred. Overlapping squares can be provided in much the same manner, with the ultimate geometric shapes being smaller squares. In this case, however, if two characteristics are to be shared by all pairs of adjacent squares one characteristic must remain uniform throughout all of the squares in each of the two fields. For example, if one field determines changes of hue and the other field determines changes of value, the chroma throughout the entire display would remain uniform. In essence, when squares are used, one field or grid would be made constant, so that the ultimate design essentially includes only two variables. If three variables are to be used, then the designer would return to the ultimate triangle areas using hexagon fields, as described. Alternatively, if more than three variable characteristics are desired, then conceivably other geometric shapes allowing for areas which possess the number of characteristics to be incorporated in the ultimate design might be utilized.

It will thus be understood that while the use of hexagons and triangles as described above constitutes the preferred embodiment hereof, the invention is not necessarily limited to such geometric shapes, but instead can be applied with varying and different geometrical shapes, depending on the intended result. Yet with the invention, an artist or designer is permitted to more or less haphazardly and randomly select the assignment of hue, value, chroma, depth, or other characteristics to the starting matrix or patterns, and still there is an organization in the ultimate design which tends to assure most pleasing and acceptable appearance.

As to the commercial applicability of the invention, it is to be understood that in addition to the field of advertising, this invention could be applied most appropriately to mosaics, linoleum, wallpaper, textiles, rugs, and other media.

What is claimed is:

1. A visual display having different visual characteristics in different portions thereof, said display comprising a multiude of identically shaped areas,
    (a) each area in said display having at least three visual characteristics,
    (b) all areas in said display adjacent any given one area in said display, having at least two of said characteristics in said given one area.

2. A visual display as defined in claim 1 wherein said areas are triangular.

3. A visual display as defined in claim 1 wherein said visual characteristics are hue, value, and chroma.

4. A visual display as defined in claim 1 wherein at least one of said characteristics is depth.

5. A visual display having different hue, value and chroma characteristics in areas thereof, said display consisting of a multiude of identically shaped color areas,
    (a) each color area in said display having a given hue, value and chroma characteristic,
    (b) all color areas adjacent any given one color area in said display having at least two of said characteristics the same as two of the three characteristics in said given one area.

6. A visual display as defined in claim 5 wherein said areas are triangular.

7. A method of organizing a display having different visual characteristics in different portions thereof, said method comprising the steps of:
    (a) providing a plurality of series of identical geometrically shaped patterns,
    (b) assigning to each of said series different visual characteristics,
    (c) overlapping portions of each of said series of patterns to define identically shaped adjacent areas throughout a display, and
    (d) assigning to each area the characteristics of the overlapped portion of the series defining the area.

8. The method defined in claim 7 wherein said geometrically shaped patterns are continuous adjacent hexagons, and wherein said areas are triangles.

9. The method defined in claim 7 wherein said characteristics are hue, value and chroma.

10. The method defined in claim 7 wherein said steps (a) and (c) are carried out simultaneously.

11. A method of organizing a display having a multitude of identically shaped equaly dimensioned adjacent color areas therein, said method comprising the steps of:
    (a) providing first, second and third series of geometric patterns having defined equaly shaped and dimensioned sections therein,
    (b) assigning to said first, second and third series respectively hue, value and chroma characteristics, (c) overlapping said series of patterns to define said color areas, and
(d) assigning to each said color areas the hue, value and chroma characteristic of the portions of the patterns overlapped to define that area.

12. The method defined in claim 11 wherein said equally shaped and dimentioned sections are hexagons and wherein said color areas are triangles.

13. The method defined in claim 11 wherein said steps (a) and (c) are carried out simultaneously.

14. The method defined in claim 11 wherein said hue, value and chroma characteristics respectively differ within the respective patterns to which they are assigned.

References Cited by the Examiner
UNITED STATES PATENTS 1,871,078  8/1932  Nash _____ 35—28.3
1,893,944  1/1933  Johnson _____ 35—27

EUGENE R. CAPOZIO, *Primary Examiner.*

H. S. SKOGQUIST, *Assistant Examiner.*